United States Patent [19]

Muramoto

[11] Patent Number: 5,547,913

[45] Date of Patent: Aug. 20, 1996

[54] PROCESS FOR PRODUCING EXHAUST-GASES-PURIFYING CATALYST

[75] Inventor: Riemi Muramoto, Toyota, Japan

[73] Assignee: Toyota Jidosha Kabushiki Kaisha, Aichi-ken, Japan

[21] Appl. No.: 356,662

[22] Filed: Dec. 15, 1994

[30] Foreign Application Priority Data

Dec. 17, 1993 [JP] Japan ..................... 5-318449

[51] Int. Cl.$^6$ ..................... B01J 23/58
[52] U.S. Cl. ............ 502/328; 423/213.2; 502/502
[58] Field of Search ............. 423/213.5, 213.2; 502/330, 320, 328

[56] References Cited

FOREIGN PATENT DOCUMENTS

| | | |
|---|---|---|
| 0337730 | 10/1989 | European Pat. Off. . |
| 0461949 | 12/1991 | European Pat. Off. . |
| 2189112 | 1/1974 | France . |
| 3832268 | 4/1989 | Germany . |
| 60-206448 | 10/1985 | Japan . |
| 61-181538 | 8/1986 | Japan . |
| 5-317652 | 12/1993 | Japan . |

Primary Examiner—Asok Pal
Attorney, Agent, or Firm—Oliff & Berridge

[57] ABSTRACT

A process for producing an exhaust-gases-purifying catalyst includes the steps of loading an $NO_x$ adsorbent on a porous support, carbonating the porous support with the $NO_x$ adsorbent loaded, thereby converting the $NO_x$ adsorbent into carbonate, and loading a noble metal catalyst ingredient on the porous support with the carbonate loaded. The process can produce an exhaust-gases-purifying catalyst on which the $NO_x$ adsorbent and the noble metal catalyst ingredient are loaded in large amounts and which can stably and efficiently purify $NO_x$ during the fuel-lean side (i.e., in the oxygen-rich atmospheres) driving.

19 Claims, No Drawings

PROCESS FOR PRODUCING EXHAUST-GASES-PURIFYING CATALYST

BACKGROUND OF THE INVENTION

1. Field of the Invention

The present invention relates to a process for producing an exhaust-gases-purifying catalyst. More particularly, it relates to a process for producing an exhaust-gases-purifying catalyst which can efficiently purify nitrogen oxides ($NO_x$) in exhaust gases whose oxygen concentrations are at the stoichiometric point or more than required for oxidizing carbon monoxide (CO) and hydrocarbons (HC) therein.

2. Description of Related Art

As catalysts for purifying automotive exhaust gases, there have been employed 3-way catalysts so far which oxidize CO and HC and reduce $NO_x$ to purify the exhaust gases. For example, the 3-way catalysts have been known widely which comprise a heat resistant support formed of cordierite, a catalyst carrier layer formed of gamma-alumina and disposed on the support, and a noble metal catalyst ingredient selected from the group consisting of Pt, Pd and Rh and loaded on the catalyst carrier layer.

The purifying performance of the 3-way catalysts for purifying exhaust gases depends greatly on the air-fuel ratio A/F of automotive engine. For instance, when the air-fuel weight ratio is larger than 14.6, i.e., when the fuel concentration is low (or on the fuel-lean side), the oxygen concentration is high in exhaust gases. Accordingly: the oxidation reactions purifying CO and HC are active, but the reduction reactions purifying $NO_x$ are inactive. On the other hand, when the air-fuel ratio is smaller than 14.6, i.e., when the fuel concentration is higher (or on the fuel-rich side), the oxygen concentration is low in exhaust gases. Accordingly, the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side. In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ even on the fuel-lean side (i.e., in the oxygen-rich atmospheres).

In view of the aforementioned circumstances, the applicant of the present invention and others applied for a Japanese Patent for a novel catalyst under Japanese Patent Application No. 4-130,904 (Japanese Unexamined Patent Publication (KOKAI) No. 5-317,652 which was not laid-open at the time of a Japanese Patent application corresponding to the present application). On this catalyst, there are loaded an alkaline-earth metal oxide and Pt. On the catalyst, for example, barium is loaded in the form of its simple oxide. In the catalyst, during the fuel-lean side (i.e., in the oxygen-rich atmospheres) driving, the simple oxide reacts with $NO_x$ to form alkaline-earth metal nitrate (e.g., barium nitrate ($Ba(NO_3)_2$), and the alkaline-earth metal nitrate reacts with the reducing gas such as HC and the like to be purified. As a result, the catalyst exhibits superb $NO_x$ purifying performance during the fuel-lean side (i.e., in the oxygen-rich atmospheres) driving.

Japanese Unexamined Patent Publication (KOKAI) No. 5-317,652 also sets forth a process for producing the catalyst. That is, an active alumina coating layer is formed on a support made from cordierite or the like, and Pt is loaded on the coating layer by an ordinary method. Thereafter, the coating layer is impregnated with an aqueous solution of barium acetate or the like, dried and calcinated to load Ba or the like thereon.

However, in the case where Pt is loaded, and thereafter Ba or the like is loaded, Pt is covered with Ba or the like. Accordingly, Pt might not be able to fully exhibit its inherent functions. Namely, the catalyst might not be able to sufficiently exhibit its NO oxidation action and its $NO_2$ reduction action. As a result, there arises a problem in that the catalyst might exhibit deteriorated $NO_x$ conversion which is lower than expected $NO_x$ conversion.

Hence, one can think of first loading Ba or the like and then loading Pt. However, this process might result in a problem in that Ba or the like, loaded on purpose, elutes into an aqueous solution for loading Pt. When loaded Ba or the like elutes into an aqueous solution of Pt compound, not only the loading amount of Ba or the like might be decreased, but also Pt might be eventually precipitated and deposited by variation of the pH value in the aqueous solution. As a result, the loading amount of Pt might be decreased.

SUMMARY OF THE INVENTION

The present invention has been developed in view of the aforementioned circumstances. It is therefore an object of the present invention to provide a process for producing an exhaust-gases-purifying catalyst which enables to finally load noble metal catalyst ingredient, which enables to inhibit an $NO_x$ adsorbent such as Ba or the like from eluting, and which enables to load the $NO_x$ adsorbent and the noble metal catalyst ingredient in large amounts.

A process for producing an exhaust-gases-purifying catalyst according to the present invention can carry out the above-described object, and can solve the aforementioned problems. The present process comprises the steps of:

loading an $NO_x$ adsorbent on a porous support;

carbonating the porous support with the $NO_x$ adsorbent loaded, thereby converting the $NO_x$ adsorbent into carbonate; and loading a noble metal catalyst ingredient on the porous support with the carbonate loaded.

As for the porous support, it is possible to employ a honeycomb support made from cordierite, a honeycomb support coated with an active alumina coating layer, and a honeycomb support made from heat resistant metal and coated with an active alumina coating layer.

As for the $NO_x$ adsorbent, it is possible to employ at least one metallic compound selected from the group consisting of alkali metal compound, alkaline-earth metal compound and rare-earth element compound. As for alkali metal element constituting the alkali metal compound, it is possible to employ at least one element selected from the group consisting of K, Li, Na, Rb and Cs. As for alkaline-earth metal element constituting the alkaline-earth metal compound, it is possible to employ at least one element selected from the group consisting of Mg, Ca, Br, Ba and Ra, and it is especially preferable to employ at least one element selected from the group consisting of Ba and Br. As for rare-earth element constituting the rare-earth element compound, it is possible to employ at least one element selected from the group consisting of lanthanides, and it is especially preferable to employ at least one element selected from the group consisting of La, Pt, Nd and Sm.

Moreover, in the step of loading $NO_x$ adsorbent, it is preferable to load the $NO_x$ adsorbent on the porous support in an amount of from 0.05 to 1.0 mole with respect to 1 liter of the porous support.

As for the carbonating, the following methods are available: bringing the porous support, with the $NO_x$ adsorbent loaded, into contact with an aqueous solution of carbonic acid, bringing the support into contact with an aqueous solution of ammonium carbonate, and bringing the support into contact with a $CO_2$ gas. When bringing the support into contact with the carbonic acid aqueous solution or the ammonium carbonate aqueous solution, it is preferable to saturate the aqueous solution and use the saturated aqueous solution. When bringing the support into contact with the $CO_2$ gas, it is preferable to use the $CO_2$ gas having a $CO_2$ concentration of 10% by volume or more and to bring the support into contact with the $CO_2$ gas which is heated to a temperature of from 100° to 650° C. It is also possible to heat the support to the temperature and bring it into contact with the $CO_2$ gas.

Further, in the step of carbonating, it is preferable to bring the support into contact with the aqueous solution of carbonic acid at room temperature for a period of from 0.5 to 5 hours. Furthermore, in the step of carbonating, it is preferable to bring the support into contact with the aqueous solution of ammonium carbonate at room temperature for a period of from 0.5 to 50 hours. Moreover, in the step of carbonating, it is preferable to bring the support into contact with the $CO_2$ gas at the temperature of from 100° to 650° C. for a period of from 0.5 and 48 hours.

As for the noble metal catalyst ingredient, it is possible to employ at least one element selected from the group consisting of Pt, Pd and Rh. Moreover, it is preferable to load the noble metal catalyst ingredient on the porous support in an amount of from 0.1 to 10 grams with respect to 1 liter of the porous support.

In the present process for producing an exhaust-gases-purifying catalyst, the $NO_x$ adsorbent is first loaded on the porous support in the $NO_x$ adsorbent loading step, and it is carbonated in the carbonating step. Thus, the $NO_x$ adsorbent is converted into carbonate, and it is now insoluble or difficult to dissolve into an aqueous solution of a noble metal catalyst ingredient which is used in the subsequent noble metal catalyst ingredient loading step. As a result, when the porous support is immersed into an aqueous solution of a noble metal catalyst ingredient in the subsequent loading step, the $NO_x$ adsorbent can be inhibited from eluting into the aqueous solution.

Hence, the loading amount of the $NO_x$ loaded in the $NO_x$ adsorbent loading step hardly varies, and accordingly initial high $NO_x$ adsorbent loading can be maintained. Moreover, since the $NO_x$ adsorbent scarcely elutes, the pH little varies in the aqueous solution of a noble metal catalyst ingredient. Consequently, the noble metal catalyst ingredient can be inhibited from precipitating and depositing. Thus, in the noble metal catalyst ingredient loading step, the noble metal catalyst ingredient can be loaded in a large amount.

In particular, the $NO_x$ adsorbent is loaded, and thereafter the noble metal catalyst ingredient is loaded. Therefore, there scarcely arises the problem in that the noble metal catalyst ingredient is covered with the $NO_x$ adsorbent, and accordingly the catalytic actions of the noble metal catalyst ingredient can be maximized.

In accordance with the present process for producing an exhaust-gases-purifying catalyst, the $NO_x$ adsorbent and the noble metal catalyst ingredient can be loaded in large amounts, respectively. Hence, an exhaust-gases-purifying catalyst produced in accordance with the present process can be maximized in terms of the $NO_x$ adsorbing action resulting from the $NO_x$ adsorbent as well as the oxidation and reduction actions resulting from the noble metal catalyst ingredient. Further, the catalyst can exhibit favorable $NO_x$ purifying performance even after a durability test. Furthermore, the catalyst can stably and efficiently purify $NO_x$ during the fuel-lean side (i.e., in the oxygen-rich atmospheres) driving.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

Unless otherwise specified, the term, "parts" hereinafter, means "parts by weight."

First Preferred Embodiment 100 parts of an alumina powder, 70 parts of alumina sol containing alumina in an amount of 10% by weight, 15 parts of an aqueous aluminum nitrate solution containing aluminum nitrate in an amount of 40% by weight, and 30 parts of water were mixed, thereby preparing a slurry for coating.

Then, a plurality of honeycomb supports formed of cordierite were immersed into the slurry, and thereafter each of them was blown to blow away the slurry in excess. Each of the supports was dried, and thereafter each of them was calcinated at 600° C. for 1 hour, thereby forming an alumina coating layer thereon. The alumina coating layer was thus coated on the honeycomb support in an amount of 120 grams with respect to 1 liter of the honeycomb support.

$NO_x$ Adsorbent Loading Step

Each of the honeycomb supports having the alumina coating layer thereon was immersed into a mixed aqueous solution of barium acetate and lithium nitrate, and thereafter each of them was blown to blow away the water droplets in excess. Each of the supports was dried at 120° C., and each of them was calcinated at 500° C. for 1 hour, thereby loading Ba and Li thereon. The Ba was thus loaded thereon in an amount of 0.3 moles with respect to 1 liter of the honeycomb support. The Li was thus loaded thereon in an amount of 0.1 mole with respect to 1 liter of the honeycomb support. When this step is completed, the Ba and Li were loaded thereon as its hydroxide and oxide, respectively. That is, the Ba and Li in the form of its hydroxide and oxide were likely to elute into an aqueous solution of a noble metal catalyst ingredient later described.

Carbonating Step

In order to overcome the aforementioned drawback, each of the honeycomb supports with the Ba and Li loaded was immersed into a saturated carbonic acid aqueous solution at ordinary temperature for 1 hour. After taking each of the supports out of the saturated carbonic acid aqueous solution, each of them was dried at 120° C. Thus, the Ba and Li were converted into their insoluble carbonates, e.g., $BaCO_3$ and $Li_2CO_3$, respectively.

Noble Metal Catalyst Ingredient Loading Step

Each of the honeycomb supports undergone up to the carbonating step, each of them was immersed into an aqueous platinum dinitrodiammine solution having a predetermined concentration, and thereafter it was blown to blow away the water droplets in excess. After the blowing, each of the supports was dried, and each of them was calcinated at 250° C. for 1 hour, thereby loading Pt thereon. The loading amount of Pt was 2.0 grams with respect to 1 liter of the honeycomb support. Moreover, each of the honeycomb supports with the Pt loaded was immersed into an aqueous rhodium chloride solution having a predetermined concentration, and thereafter each of them was blown to blow away the water droplets in excess. After the blowing, each of the supports was dried, and each of them was calcinated at 250° C. for 1 hour, thereby loading Rh thereon. The loading amount of Rh was 0.1 grams with respect to 1 liter of the honeycomb support.

During the noble metal catalyst ingredient loading step, the Ba and Li were loaded as their carbonates, and accordingly they hardly eluted into the aqueous platinum dinitrodiammine solution and into the aqueous rhodium chloride solution. As a result, during this loading step, their initial loading amounts could be maintained. Moreover, since they hardly eluted into the aqueous solutions, the pH values scarcely varied in the aqueous solutions so that the Pt and Rh little precipitated.

In addition, during the noble metal catalyst ingredient loading step, loading rates of the Pt and Rh were derived from the variations between the concentrations of the aqueous platinum dinitrodiammine solution and the aqueous rhodium chloride solution before and after the noble metal catalyst ingredient loading step. Moreover, elution rates of the Ba and Li were derived from the concentrations of the Ba and Li in the aqueous solutions after the noble metal catalyst ingredient loading step. The thus derived loading rates and elution rates are summarized in Table 1 below.

Second Preferred Embodiment

Except that, in the carbonating step, a 1N ammonium carbonate aqueous solution was used, the Second Preferred Embodiment of the present process was carried out in the same manner as the First Preferred Embodiment. Namely, in the carbonating step, each of the honeycomb supports with the Ba and Li loaded was immersed into and processed in the ammonium carbonate aqueous solution, instead of the saturated carbonic acid aqueous solution, at ordinary temperature for 1 hour.

Third Preferred Embodiment

Except that, in the carbonating step, each of the honeycomb supports with the Ba and Li loaded was processed in a $CO_2$ gas atmosphere heated to 300° C., instead of immersing it into the saturated carbonic acid aqueous solution, for 1 hour, the Third Preferred Embodiment of the present process was carried out in the same manner as the First Preferred Embodiment.

COMPARATIVE EXAMPLE NO. 1

Except that the noble metal catalyst ingredient loading step was carried out subsequent to the $NO_x$ adsorbent loading step, Comparative Example No. 1 was carried out in the same manner as the First Preferred Embodiment.

COMPARATIVE EXAMPLE NO. 2

Except that the noble metal catalyst ingredient loading step was first carried out, thereafter the $NO_x$ adsorbent loading step was carried out, and no carbonating step was carried out, Comparative Example No. 2 was carried out in the same manner as the First Preferred Embodiment.

Fourth Preferred Embodiment

Except that, in the $NO_x$ adsorbent loading step, no lithium nitrate aqueous solution was used to load Ba only, the Fourth Preferred Embodiment of the present process was carried out in the same manner as the First Preferred Embodiment.

COMPARATIVE EXAMPLE NO. 3

Except that, in the $NO_x$ adsorbent loading step, no lithium nitrate aqueous solution was used to load Ba only, and the noble metal catalyst ingredient loading step was carried out subsequent to the $NO_x$ adsorbent loading step without being intervened by the carbonating step, Comparative Example No. 3 was carried out in the same manner as the First Preferred Embodiment.

COMPARATIVE EXAMPLE NO. 4

Except that the noble metal catalyst ingredient loading step was first carried out to load the noble metal catalyst ingredients, and, in the $NO_x$ adsorbent loading step, no lithium nitrate aqueous solution was used to load Ba only, and no carbonating step was carried out, Comparative Example No. 4 was carried out in the same manner as the First Preferred Embodiment.

Fifth Preferred Embodiment

Except that, in the $NO_x$ adsorbent loading step, no lithium nitrate aqueous solution was used, and, instead of the barium acetate aqueous solution, a strontium acetate aqueous solution was used to load Sr in the same loading amount, the Fifth Preferred Embodiment of the present process was carried out in the same manner as the First Preferred Embodiment.

COMPARATIVE EXAMPLE NO. 5

Except that, in the $NO_x$ adsorbent loading step, no lithium nitrate aqueous solution was used, and, instead of the barium acetate aqueous solution, a strontium acetate aqueous solution was used to load Sr, and the noble metal catalyst ingredient loading step was carried out subsequent to the $NO_x$ adsorbent loading step without being intervened by the carbonating step, Comparative Example No. 5 was carried out in the same manner as the First Preferred Embodiment.

COMPARATIVE EXAMPLE NO. 6

Except that the noble metal catalyst ingredient loading step was first carried out to load the noble metal catalyst ingredients, and, in the $NO_x$ adsorbent loading step, no lithium nitrate aqueous solution was used, and, instead of the barium acetate aqueous solution, a strontium acetate aqueous solution was used to load Sr, and no carbonating step was carried out, Comparative Example No. 5 was carried out in the same manner as the First Preferred Embodiment.

Sixth Preferred Embodiment

Except that, in the $NO_x$ adsorbent loading step, no lithium nitrate aqueous solution was used, and, instead of the barium acetate aqueous solution, a calcium acetate aqueous solution was used to load Ca in the same loading amount, the Sixth Preferred Embodiment of the present process was carried out in the same manner as the First Preferred Embodiment.

COMPARATIVE EXAMPLE NO. 7

Except that, in the $NO_x$ adsorbent loading step, no lithium nitrate aqueous solution was used, and, instead of the barium acetate aqueous solution, a calcium acetate aqueous solution was used to load Ca, and the noble metal catalyst ingredient loading step was carried out subsequent to the $NO_x$ adsorbent loading step without being intervened by the carbonating step, Comparative Example No. 7 was carried out in the same manner as the First Preferred Embodiment.

COMPARATIVE EXAMPLE NO. 8

Except that the noble metal catalyst ingredient loading step was first carried out to load the noble metal catalyst ingredients, and, in the $NO_x$ adsorbent loading step, no lithium nitrate aqueous solution was used, and, instead of the barium acetate aqueous solution, a calcium acetate aqueous solution was used to load Ca, and no carbonating step was carried out, Comparative Example No. 8 was carried out in the same manner as the First Preferred Embodiment.

Seventh Preferred Embodiment

Except that, in the $NO_x$ adsorbent loading step, no lithium nitrate aqueous solution was used, and, instead of the barium acetate aqueous solution, a magnesium acetate aqueous solution was used to load Mg in the same loading amount, the Seventh Preferred Embodiment of the present process was carried out in the same manner as the First Preferred Embodiment.

COMPARATIVE EXAMPLE NO. 9

Except that, in the $NO_x$ adsorbent loading step, no lithium nitrate aqueous solution was used, and, instead of the barium acetate aqueous solution, a magnesium acetate aqueous solution was used to load Mg, and the noble metal catalyst ingredient loading step was carried out subsequent to the $NO_x$ adsorbent loading step without being intervened by the carbonating step, Comparative Example No. 8 was carried out in the same manner as the First Preferred Embodiment.

COMPARATIVE EXAMPLE NO. 10

Except that the noble metal catalyst ingredient loading step was first carried out to load the noble metal catalyst ingredients, and, in the $NO_x$ adsorbent loading step, no lithium nitrate aqueous solution was used, and, instead of the barium acetate aqueous solution, a magnesium acetate aqueous solution was used to load Mg, and no carbonating step was carried out, Comparative Example No. 10 was carried out in the same manner as the First Preferred Embodiment.

TABLE 1

| | NOx Adsorbent | Noble Metal Catalyst Ingredient | Order of Steps | Loading Rate (%) of Pt | Loading Rate (%) of Rh | Elution Rate (%) of Adsorbent | Initial NOx Conversion (%) | NOx Conversion After Durability Test |
|---|---|---|---|---|---|---|---|---|
| 1st Pref. Embodiment | Ba and Li | Pt and Rh | 1)-2)-3) | 95 | 98 | 5 | 89 | 65 |
| 2nd Pref. Embodiment | Ba and Li | Pt and Rh | 1)-2)-3) | 90 | 92 | 20 | 87 | 60 |
| 3rd Pref. Embodiment | Ba and Li | Pt and Rh | 1)-2)-3) | 90 | 90 | 15 | 85 | 60 |
| Comp. Ex. No. 1 | Ba and Li | Pt and Rh | 1)-3) | 84 | 80 | 60 | 80 | 53 |
| Comp. Ex. No. 2 | Ba and Li | Pt and Rh | 3)-1) | 95 | 97 | — | 91 | 50 |
| 4th Pref. Embodiment | Ba | Pt and Rh | 1)-2)-3) | 94 | 96 | 7 | 89 | 59 |
| Comp. Ex. No. 3 | Ba | Pt and Rh | 1)-3) | 82 | 83 | 55 | 81 | 50 |
| Comp. Ex. No. 4 | Ba | Pt and Rh | 3)-1) | 94 | 96 | — | 90 | 45 |
| 5th Pref. Embodiment | Sr | Pt and Rh | 1)-2)-3) | 95 | 97 | 7 | 83 | 55 |
| Comp. Ex. No. 5 | Sr | Pt and Rh | 1)-3) | 81 | 80 | 50 | 79 | 48 |
| Comp. Ex. No. 6 | Sr | Pt and Rh | 3)-1) | 95 | 95 | — | 85 | 43 |
| 6th Pref. Embodiment | Ca | Pt and Rh | 1)-2)-3) | 95 | 96 | 5 | 83 | 57 |
| Comp. Ex. No. 7 | Ca | Pt and Rh | 1)-3) | 80 | 83 | 48 | 79 | 47 |
| Comp. Ex. No. 8 | Ca | Pt and Rh | 3)-1) | 96 | 98 | — | 85 | 43 |
| 7th Pref. Embodiment | Mg | Pt and Rh | 1)-2)-3) | 95 | 98 | 7 | 85 | 59 |
| Comp. Ex. No. 9 | Mg | Pt and Rh | 1)-3) | 80 | 82 | 49 | 80 | 50 |
| Comp. Ex. No. 10 | Mg | Pt and Rh | 3)-1) | 96 | 98 | — | 87 | 47 |

(Note)
In the column of "Order of Steps,"
1) designates the NOx loading step;
2) designates the carbonating step; and
3) designates the noble metal catalyst ingredient loading step.

Examination and Evaluation

Each of the catalysts produced by the First through Seventh Preferred Embodiments and Comparative Example Nos. 1 through 10 was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the catalysts for the conversion of $NO_x$. The results of the examination are summarized in the column designated at "Initial $NO_x$ Conversion" in Table 1.

After the aforementioned evaluation, each of the catalysts produced by the First through Seventh Preferred Embodiments and Comparative Example Nos. 1 through 10 was subjected to a bench test on durability which utilized the same type of engine as above. Namely, each of them was disposed in an exhaust line of the engine, and then the engine was run for 50 hours while adjusting the temperature of the exhaust gas introduced into them at 650° C. at an air-fuel ratio A/F of 18. After this bench test was over, each of them was again disposed in the exhaust line of the actual vehicle. The vehicle was driven in the same manner as described above, thereby examining the catalysts for the conversion of $NO_x$. The results of the examination are summarized in the column designated at "$NO_x$ Conversion after Durability Test" in Table 1.

In addition, during the noble metal catalyst ingredient loading step, loading rates of the Pt and Rh were derived from the variations between the concentrations of the Pt and Rh in the aqueous platinum dinitrodiammine solution and the aqueous rhodium chloride solution before and after the noble metal catalyst ingredient loading step. Moreover, elution rates of the Ba, Li, Sr, Ca and Mg were derived from the concentrations of the Ba, Li, Sr, Ca and Mg in the aqueous solutions after the noble metal catalyst ingredient loading step. The thus derived loading rates and elution rates are also summarized in Table 1.

It is understood from Table 1 that, although the elution rates of the $NO_x$ adsorbents were high in Comparative Example Nos. 1, 3, 5, 7 and 9 in which no carbonating step was carried, the elution rates were controlled to be low in the First through Seventh Preferred Embodiments of the present process. As a result, in the First through Seventh Preferred Embodiments of the present process, the noble metal catalyst ingredients were inhibited from precipitating and depositing, and their loading rates were kept high.

That is, both of the $NO_x$ adsorbents and the noble metal catalyst ingredients were loaded in higher loading amounts by the First through Seventh Preferred Embodiments of the present process than by Comparative Example Nos. 1, 3, 5, 7 and 9. As a result, the catalysts produced by the First through Seventh Preferred Embodiments of the present process were apparently improved in terms of the initial $NO_x$ conversion and the $NO_x$ conversion after a durability test.

Since the noble metal catalyst ingredients were first loaded and thereafter the $NO_x$ adsorbents were loaded by Comparative Example Nos. 2, 4, 6, 8 and 10, the loading rates of the noble metal catalyst ingredients were high and the catalysts produced by Comparative Example Nos. 2, 4, 6, 8 and 10 exhibited high loading rates of the noble metal catalyst ingredients as well as high initial $NO_x$ conversion. However, the catalysts produced by Comparative Example Nos. 2, 4, 6, 8 and 10 were inferior to the catalysts produced by the First through Seventh Preferred Embodiments of the present process in terms of the $NO_x$ conversion after a durability test. This disadvantageous effect is believed to result from the phenomenon that, in Comparative Example Nos. 2, 4, 6, 8 and 10, the novel metal catalyst ingredients were covered up with the $NO_x$ adsorbents as time elapsed, and that they could not fully effect their activity.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing an exhaust-gases-purifying catalyst, comprising the steps of:

loading an $NO_x$ adsorbent on a porous support, said adsorbent being capable of forming a carbonate;

carbonating said porous support with said $NO_x$ adsorbent loaded, thereby converting said $NO_x$ adsorbent into carbonate; and loading a noble metal catalyst ingredient on said porous support with said carbonate loaded, said adsorbent being inhibited, by the converting into carbonate, from eluting into an aqueous solution.

2. The process according to claim 1, wherein said step of loading further includes the step of selecting at least one metallic compound from the group consisting of alkali metal compound, alkaline-earth metal compound and rare-earth element compound as said $NO_x$ adsorbent.

3. The process according to claim 2, wherein said step of selecting further includes the step of selecting at least one element from the group consisting of K, Li, Na, Rb and Cs for constituting said alkali metal compound.

4. The process according to claim 2, wherein said step of selecting further includes the step of selecting at least one element from the group consisting of Mg, Ca, Sr, Ba and Ra for constituting said alkaline-earth metal compound.

5. The process according to claim 4, wherein said step of selecting further includes the step of selecting at least one element from the group consisting of Ba and Sr for constituting said alkaline-earth metal compound.

6. The process according to claim 2, wherein said step of selecting further includes the step of selecting at least one element from the group consisting of lanthanides for constituting said rare-earth element compound.

7. The process according to claim 6, wherein said step of selecting further includes the step of selecting at least one element from the group consisting of La, Pt, Nd and Sm for constituting said rare-earth element compound.

8. The process according to claim 1, wherein said step of loading $NO_x$ adsorbent is carried out so as to load said $NO_x$ adsorbent on said porous support in an amount of from 0.05 to 1.0 mole with respect to 1 liter of said porous support.

9. The process according to claim 1, wherein said step of carbonating is carried out by bringing said porous support, with said $NO_x$ adsorbent loaded, into contact with an aqueous solution of carbonic acid.

10. The process according to claim 9, wherein said step of carbonating is carried out by using a saturated aqueous solution of carbonic acid.

11. The process according to claim 9, wherein said step of carbonating is carried out at room temperature for a period of from 0.5 to 5 hours, which is effective to convert said $NO_x$ adsorbent into its insoluble carbonate.

12. The process according to claim 1, wherein said step of carbonating is carried out by bringing said porous support, with said $NO_x$ adsorbent loaded, into contact with an aqueous solution of ammonium carbonate.

13. The process according to claim 12, wherein said step of carbonating is carried out by using a saturated aqueous solution of ammonium carbonate.

14. The process according to claim 12, wherein said step of carbonating is carried out at room temperature for a period of from 0.5 to 5 hours, which is effective to convert said $NO_x$ adsorbent into its insoluble carbonate.

15. The process according to claim 1, wherein said step of carbonating is carried out by bringing said porous support, with said $NO_x$ adsorbent loaded, into contact with a $CO_2$ gas.

16. The process according to claim 15, wherein said step of carbonating is carried out by using said $CO_2$ gas having a $CO_2$ concentration of 10% by volume or more.

17. The process according to claim 15, wherein said step of carbonating is carried out at a temperature of from 100° to 650° C. for a period of from 0.5 to 48 hours, which is effective to convert said $NO_x$ adsorbent into its insoluble carbonate.

18. The process according to claim 1, wherein said step of loading noble metal catalyst ingredient further includes the step of selecting at least one element from the group consisting of Pt, Pd and Rh.

19. The process according to claim 1, wherein said step of loading noble metal catalyst ingredient is carried out so as to load said noble metal catalyst ingredient on said porous support in an amount of from 0.1 to 10 grams with respect to 1 liter of said porous support.

* * * * *